No. 687,189. Patented Nov. 26, 1901.
W. S. ANDREWS.
SYSTEM OF MOTOR CONTROL.
(Application filed July 25, 1901.)
(No Model.)
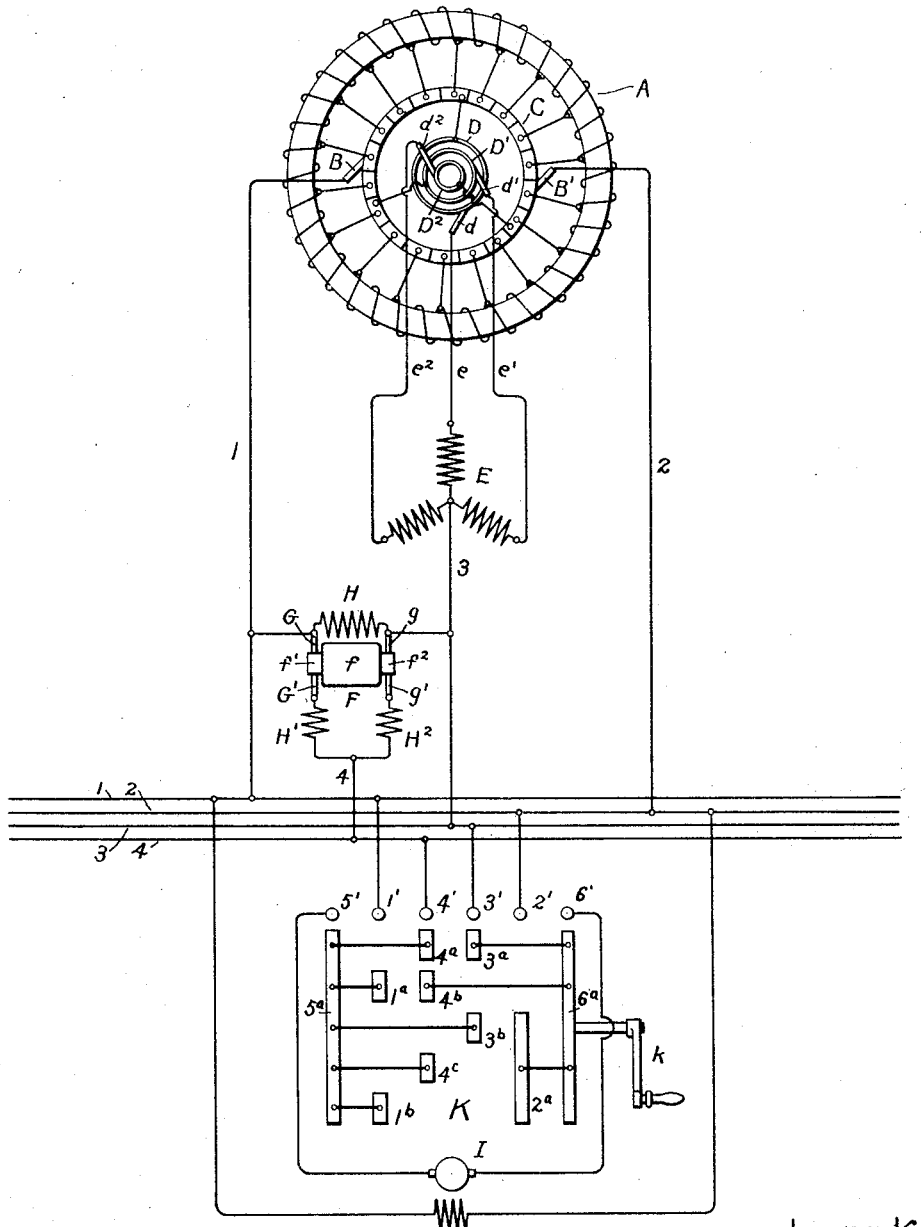
Witnesses.
John Ellis Glenn.
Benjamin B. Hull.
Inventor.
William S. Andrews
by Albert G. Davis
Atty.

UNITED STATES PATENT OFFICE.

WILLIAM S. ANDREWS, OF SCHENECTADY, NEW YORK, ASSIGNOR TO
GENERAL ELECTRIC COMPANY, A CORPORATION OF NEW YORK.

SYSTEM OF MOTOR CONTROL.

SPECIFICATION forming part of Letters Patent No. 687,189, dated November 26, 1901.

Application filed July 25, 1901. Serial No. 69,646. (No model.)

*To all whom it may concern:*

Be it known that I, WILLIAM S. ANDREWS, a citizen of the United States, residing at Schenectady, county of Schenectady, State of New York, have invented certain new and useful Improvements in Systems of Motor Control, (Case No. 2,030,) of which the following is a specification.

This invention relates to systems of transmission of power by electricity; and its object is to enable an electric motor to be furnished with currents of various voltages without the use of wasteful resistances.

In running small motors it is necessary, as a rule, to provide for only a few changes in speed.

My invention aims to derive a minimum of five different voltages from any given power-circuit, which in most cases will afford a sufficient number of changes. To accomplish this, I take advantage in part of the system proposed by Dobrowolsky and use a neutral wire connected to the center of the armature of a generator. Between one side of the circuit of said generator and said neutral wire I interpose a motor-generator or "balancer," having two separate windings on its armature, each giving a different voltage from the other. The balancer has a shunt field-coil common to both windings, and each winding has its own series field-coil, which is connected to a common conductor. A suitable switch enables one to connect the motor-terminals between any two of the four conductors, and thus impress upon it any one of several different voltages.

The accompanying drawing is a diagrammatic representation of circuits embodying my invention.

Let A represent the armature of a generator or a rotary converter supplying current through the brushes B B' to the main-line conductors 1 2. The commutator is shown at C, and on the shaft of the armature are three collector-rings D D' D², connected, respectively, to three equidistant points on the commutator. Brushes $d$ $d'$ $d^2$ rest on the rings and are connected by wires $e$ $e'$ $e^2$ with the three branches of a star-wound self-inductive coil E, whose windings unite at the center into a common neutral conductor 3. Between this conductor 3 and one of the main conductors, as 1, is a rotary converter or balancer F, having an armature $f$, containing two independent windings, one connected with a commutator $f'$ and the other with a commutator $f^2$. Brushes G G' $g$ $g'$ bear on these commutators, and between the brushes G $g$ is a shunt field-coil H common to both armature-windings. Brush G is connected with the main conductor 1 and brush $g$ with the neutral conductor 3. Brush G' is connected with a series field-coil H' and brush $g'$ with a series field-coil H², each acting upon its own armature-winding. The armature-windings and the field-coils H' H² are in series across the conductors 1 3, and at a point between them is connected a conductor 4.

Assume, for example, that the difference in potential between the conductors 1 and 2 is two hundred and forty volts. Then in accordance with the Dobrowolsky system the difference between the neutral conductor 3 and each conductor 1 2 will be one hundred and twenty volts. Assume that one winding on the armature $f$ will deliver to the brushes G G' a potential of eighty volts and that the other winding will deliver forty volts to the brushes $g$ $g'$. Then if the terminals of the armature of a shunt-wound motor I are connected across the conductors 3 4 it will receive forty volts; between conductors 1 4, eighty volts; between conductors 2 3, one hundred and twenty volts; between conductors 2 4, one hundred and sixty volts, and between conductors 1 2 two hundred and forty volts. The figures given are merely for illustration. Any convenient ratio and arrangement can be assumed.

In order to make the necessary changes, a controller K may be used, having fingers 1' 2' 3' 4', connected, respectively, with the corresponding conductors, and 5' 6', connected with the terminals of the armature of the motor. The shunt field-coil of the motor is permanently connected across the mains 1 2. The contact-segments are mounted on a movable support, such as a cylinder rotatable by a handle $k$. Strips 5ª 6ª make constant contact with the fingers 5' 6' when the controller is operated. In the first position they connect by segments $3^a\ 4^a$ with conductors 3 4 and impress upon the motor-armature I a voltage of forty. In the second position the segments $5^a\ 6^a$ connect by segments $1^a\ 4^b$ with conductors 1 4. In the third position they connect by segments $2^a\ 3^b$ with conductors 2 3, in the fourth position by segments $2^a\ 4^c$ with conductors 2 4, and in the fifth position by segments $1^b\ 2^a$ with conductors 1 2. By turning the controller-handle the operator can thus impress upon the armature of the motor I successively-increasing voltages in accordance with the speed or power required.

The operation of my invention is as follows: The rotation of the armature A sends out a continuous current over the line 1 2 and a three-phase alternating current over the wires $e\ e'\ e^2$; but the self-induction of the coils E is great enough to choke down this alternating current, so that the wire 3 is neutral between the main lines 1 2. It will, however, convey back to the armature any excess of direct current not used in either of the two circuits 1 3 or 2 3. If the motor-armature I is connected across the conductor 2 3, it will receive one-half of the potential between 1 and 2, since the conductor 3 is connected with the middle of the armature A. The motor-generator F occupies the other side of the circuit and balances the motor I, because as its two windings are in series the total voltage generated by them is equal to the potential across the conductors 2 3. When the motor I is connected across the conductors 2 4, for example, the winding in circuit with the commutator $f'$ feeds the motor, while the current flowing across the mains 1 and 3 causes the winding in circuit with the commutator $f^2$ to generate current which also feeds the motor, and since the two windings rotate at the same speed the voltage of this extra current is the same. If, for example, the current across the lines 1 3 is six amperes at one hundred and twenty volts, then the current generated by the winding $f^2$ will be $40 \times 6 = 240$ watts, which when transposed into mechanical power in speed and torque in the armature $f$ reappears in the winding $f'$ as eighty volts and three amperes, equal to two hundred and forty watts. These three amperes join with the six amperes of the line 1, and thus the motor I is supplied with nine amperes at eighty volts. If the motor I is connected between the conductors 3 and 4, it will receive a current of eighteen amperes at forty volts. If the motor is connected between the conductors 2 and 4, it will receive a current of one hundred and sixty volts and nine amperes. If connected across the mains 1 2, it takes two hundred and forty volts at six amperes.

Having thus described my invention, what I claim as new, and desire to secure by Letters Patent of the United States, is—

1. In a system for the transmission or distribution of electrical energy, the combination with means for supplying current of constant potential to a main circuit, of a neutral conductor connected with said source at a point between the main lines, a motor-generator having windings for different voltages connected in series between one of the main lines and the neutral conductor, and a fourth conductor leading from a point between said windings.

2. In a system for the transmission of power, the combination with a constant-potential main generator, of a self-inductive coil whose terminals are connected with points on the armature thereof, a neutral conductor leading from a point on said coil, a motor-generator having two windings connected with one of the main-generator brushes and with the neutral conductor, and a conductor leading from a point between said windings.

3. In a system for the transmission of power, the combination with a constant-potential main generator, of a self-inductive coil whose terminals are connected with points on the armature thereof, a neutral conductor leading from a point on said coil, a motor-generator having two windings of different voltages connected with one of the main-generator brushes and with the neutral conductor, and a conductor leading from a point between said windings.

4. In a system for the transmission of power, the combination with a constant-potential main generator, of a star-wound self-inductive coil having its three terminals connected with equidistant points on the commutator, a neutral conductor leading from the junction of the three windings on said coil, a motor-generator having two windings together equal in voltage to the drop between the main line and the neutral conductor, a shunt field-coil common to both windings, series field-coils for each winding, and a conductor connected in between said windings.

5. The combination with a motor, of a constant-potential generator, a neutral conductor connected to a point in the armature thereof, a motor-generator having windings of voltages together equal to the drop between the main line and the neutral conductor, a conductor leading from a point between said windings, and a switch for connecting the motor-terminals with any two of said conductors.

In witness whereof I have hereunto set my hand this 23d day of July, 1901.

WILLIAM S. ANDREWS.

Witnesses:
BENJAMIN B. HULL,
FRED RUSS.